(12) United States Patent
Chainer et al.

(10) Patent No.: US 10,929,577 B2
(45) Date of Patent: *Feb. 23, 2021

(54) AUTONOMOUS DEVELOPMENT OF TWO-PHASE COOLING ARCHITECTURE

(71) Applicant: International Business Machines Corporation, Armonk, NY (US)

(72) Inventors: Timothy Joseph Chainer, Putnam Valley, NY (US); Pritish Ranjan Parida, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 15/842,017

(22) Filed: Dec. 14, 2017

(65) Prior Publication Data
US 2018/0268084 A1  Sep. 20, 2018

Related U.S. Application Data

(63) Continuation of application No. 15/458,682, filed on Mar. 14, 2017.

(51) Int. Cl.
*G06F 30/20* (2020.01)
*G06F 119/08* (2020.01)

(52) U.S. Cl.
CPC .......... *G06F 30/20* (2020.01); *G06F 2119/08* (2020.01)

(58) Field of Classification Search
CPC .............................. G06F 17/50; G06F 2217/80
See application file for complete search history.

(56) References Cited

U.S. PATENT DOCUMENTS

| 6,885,982 B2 | 4/2005 | Harris et al. |
| 6,991,024 B2 * | 1/2006 | Goodson ............... F04B 19/006 165/104.21 |

(Continued)

FOREIGN PATENT DOCUMENTS

| WO | 2017120284 A1 | 7/2017 | |
| WO | WO-2017120284 A1 * | 7/2017 | ............. F28F 13/12 |

OTHER PUBLICATIONS

Sharma, Chander Shekhar, et al. "Energy efficient hotspot-targeted embedded liquid cooling of electronics." Applied Energy 138 (2015): 414-422. (Year: 2015).*

(Continued)

*Primary Examiner* — Omar F Fernandez Rivas
*Assistant Examiner* — David A Hopkins
(74) *Attorney, Agent, or Firm* — Amin, Turocy & Watson, LLP

(57) ABSTRACT

Techniques for autonomously modeling a two-phase cooling architecture are provided. In one example, a computer-implemented method can comprise generating, by a system operatively coupled to a processor, a reduced physics model based on a profile of a heat source and a parameter of a cooling structure. The reduced physics model can provide an output. Also, the computer-implemented method can comprise generating, by the system, a full physics model based on the output. The computer-implemented method can further comprise combining, by the system, the reduced physics model and the full physics model to define an architecture that achieves a flow distribution of a coolant.

10 Claims, 10 Drawing Sheets

(56) References Cited

U.S. PATENT DOCUMENTS

| | | |
|---|---|---|
| 7,472,558 B1 | 1/2009 | Narita |
| 8,630,830 B1 | 1/2014 | DiStefano, III et al. |
| 8,899,060 B2 | 12/2014 | Hall et al. |
| 2006/0162365 A1 | 7/2006 | Hoang et al. |
| 2008/0123297 A1 | 5/2008 | Tilton et al. |
| 2014/0096102 A1 | 4/2014 | Fu et al. |
| 2015/0230366 A1 | 8/2015 | Shedd et al. |

OTHER PUBLICATIONS

Hardt, S., and To Baier. "A computational model for heat transfer in multichannel nnicroreactors." ASME 3rd International Conference on Microchannels and Minichannels. American Society of Mechanical Engineers, 2005. (Year: 2005).*
Matin et al. "Modeling and Simulation Challenges in Embedded Two Phase Cooling: DARPA's ICECool Program." ASME 2015 International Technical Conference and Exhibition on Packaging and Integration of Electronic and Photonic Microsystems collocated with the ASME 2015 13th Inte (Year: 2015).*
Search History of Parent U.S. Appl. No. 15/458,682 (Year: 2019).*
Wikipedia, "Junction Temperature", Accessed May 14, 2019 (Year: 2019).*
Li, Ningkang, et al. "Hybrid porous media and fluid domain modeling strategy to optimize a novel staggered fin heat sink design." 19th International Workshop on Thermal Investigations of ICs and Systems (THERMINIC). IEEE, 2013. (Year: 2013).*
Kolter et al., "15-780—Graduate Artificial Intelligence: Optimization", Carnegie Mellon University, Spring 2017, Accessed at http://www.cs.cmu.edu/~arielpro/15780s17/slides/optinnization.pdf (Year: 2017).*
Milano, "Constraint Programming Approach to AI Applications", 1999, Accessed at http://cse.unl.edu/~choueiry/F09-990-02/resources.html (Year: 1999).*
Pham, Duc, and Dervis Karaboga. Intelligent optimisation techniques: genetic algorithms, tabu search, simulated annealing and neural networks. Springer Science & Business Media, 2012. (Year: 2012).*
Xianming Dai, Mehdi Famouri, and Chen Li, "Multiscale Thermal Transport in Energy Systems", edited by Yuewen Zhang and Ya-Ling He, Nova Science Publishers, Inc. NY, USA, 2016 (Year: 2016).*
Fan, Yilin, and Lingai Luo. "Recent applications of advances in microchannel heat exchangers and multi-scale design optimization." Heat Transfer Engineering 29.5 (2008): 461-474. (Year: 2008).*
Wikipedia, Mass Flow Rate, Accessed via Wayback Machine, Archive Date Aug. 29, 2010 (Year: 2010).*
Final Rejection for U.S. Appl. No. 15/458,682, dated Mar. 4, 2020 (Year: 2020).*
Husain, Afzal, and Kwang-Yong Kim. "Design optimization of manifold microchannel heat sink through evolutionary algorithm coupled with surrogate model." IEEE Transactions on Components, Packaging and Manufacturing Technology 3.4 (2013): 617-624. (Year: 2013).*
Non Final Office Action for U.S. Appl. No. 15/458,682, dated Dec. 5, 2018, 21 pages.
Pritish, Parida R. "Reduced Order Modeling for Chip-Embedded Micro-Channel Flow Boiling." ASME. International Electronic Packaging Technical Conference and Exhibition, vol. 1: Thermal Management ()V001T09A085. doi: 10.1115/IPACK2015-48370. (Year: 2015). 10 pages.
Fang, Chen, et al. "Volume of Fluid Simulation of Boiling Flow in a Vapor-Venting Microchannel." Frontiers of Heat and Mass Transfer, vol. 1, 013002. (Year: 2010). 11 pages.
Saenen, Tom, et al. "Numerical model of a two-phase microchannel heart sink electronics cooling sytem." International Journal of Thermal Sciences, vol. 59, 2012. pp. 214-223, ISSN 1290-0729, https://doi.org/10.1016/j.ijthermalsci.2012.04.018. (Year: 2012). 23 pages.
Chainer et al., "System Level Model for Pumped Two-Phase Cooling Systems," U.S. Appl. No. 15/276,379, filed Sep. 26, 2016. Last accessed Dec. 12, 2016, 53 pages.
Kelkar et al., "Computational method for generalized analysis of pumped two-phase cooling systems and its application to a system used in data-center environments," 12th IEEE Intersociety Conference on Thermal and Thermomechanical Phenomena in Electronic Systems, 2010, Last accessed Dec. 12, 2016, 11 pages.
Saenen et al., "Numerical model of a two-phase microchannel heat sink electronics cooling system," International Journal of Thermal Sciences, vol. 59, 2012, Last accessed Dec. 12, 2016 pp. 214-223.
Adham et al., "Thermal and hydrodynamic analysis of microchannel heat sinks: A review." Renewable and Sustainable Energy Reviews, vol. 21, Feb. 13, 2013, pp. 614-622.
Barrau et al., "Effect of a hybrid jet impingement/micro-channel cooling device on the performance of densely packed PV cells under high concentration." Aug. 5, 2011, 11 pages.
Krishnan et al., "A novel hybrid heat sink using phase change materials for transient thermal management of electronics." CTRC Research Publications Jun. 1, 2005, 35 pages.
Sung et al., "Single-phase and two-phase cooling using hybrid micro-channel/slot-jet module." Mar. 20, 2008, pp. 3825-3839.
Parida, "Reduced order modeling for chip-embedded micro-channel flow boiling." Proceedings of the ASME 2015 International Technical Conference and Exhibition on Packaging and Integration of Electronic and Photonic Microsystems, Last accessed Feb. 22, 2017, 10 pages.
Final Office Action received for U.S. Appl. No. 15/458,682, dated May 29, 2019, 74 pages.
Sarangi et al., "Manifold microchannel heat sink design using optimization under uncertainty" International Journal of Heat and Mass Transfer 69, 2014, pp. 92-105.
Parida et al., "Study of Two-phase Pressure Drop and Heat Transfer in a Micro-Scale Pin Fin Cavity: Part B" 2016 15th IEEE Intersociety Conference on Thermal and Thermomechanical Phenomena in Electronic Systems (ITHERM). IEEE, 2016, 9 pages.
Sridhar et al., "STEAM: a fast compact thermal model for two-phase cooling of integrated circuits" Proceedings of the International Conference on Computer-Aided Design. IEEE Press, 2013, pp. 256-263.
Advisory Action received for U.S. Appl. No. 15/458,682, dated Aug. 15, 2019, 74 pages.
Pacio, Julio Cesar, "Multi scale thermo-hydraulic modeling of cryogenic heat exchangers", Norwegian University of Science and Technology, Web. https://www.osti.gov/etdeweb/biblio/21573430, Jan. 2012, 25 pages.
Sacco et al. "A multiscale thermo-fluid computational model for a two-phase cooling system", Computer Methods in Applied Mechanics and Engineering 282, 2014, pp. 239-268.
Non Final Office Action received for U.S. Appl. No. 15/458,682, dated Oct. 9, 2019, 49 pages.

\* cited by examiner

┌─────────────────────────────────────────────────────────┐
│ GENERATING, BY A SYSTEM OPERATIVELY COUPLED TO A        │
│ PROCESSOR, A REDUCED PHYSICS MODEL BASED ON A PROFILE   │ ← 902
│ OF A HEAT SOURCE AND A PARAMETER OF A COOLING           │
│ STRUCTURE, WHEREIN THE REDUCED PHYSICS MODEL CAN        │
│ PROVIDE AN OUTPUT                                       │
└─────────────────────────────────────────────────────────┘
                            ↓
┌─────────────────────────────────────────────────────────┐
│ DETERMINING, BY THE SYSTEM, WHETHER THE REDUCED         │ ← 904
│ PHYSICS MODEL COMPLIES WITH AN OPERATIONAL              │
│ CONSTRAINT                                              │
└─────────────────────────────────────────────────────────┘
                            ↓
┌─────────────────────────────────────────────────────────┐
│ ALTERING, BY THE SYSTEM, THE PARAMETER BASED ON A       │
│ DETERMINATION THAT THE REDUCED PHYSICS MODEL DOES       │ ← 906
│ NOT COMPLY WITH THE OPERATIONAL CONSTRAINT              │
└─────────────────────────────────────────────────────────┘
                            ↓
┌─────────────────────────────────────────────────────────┐
│ GENRATING, BY THE SYSTEM, A FULL PHYSICS MODEL BASED    │
│ ON THE OUTPUT AND A SECOND PARAMETER OF A SECOND        │ ← 908
│ COOLING STRUCTURE                                       │
└─────────────────────────────────────────────────────────┘
                            ↓
┌─────────────────────────────────────────────────────────┐
│ DETERMINING, BY THE SYSTEM, WHETHER THE FULL PHYSICS    │ ← 910
│ MODEL COMPLIES WITH AN OPERATIONAL CONTRAINT            │
└─────────────────────────────────────────────────────────┘
                            ↓
┌─────────────────────────────────────────────────────────┐
│ ALTERING, BY THE SYSTEM, THE SECOND PARAMETER BASED     │
│ ON A DETERMINATION THAT THE FULL PHYSICS MODEL DOES     │ ← 912
│ NOT COMPLY WITH THE OPERATIONAL CONSTRAINT              │
└─────────────────────────────────────────────────────────┘
                            ↓
┌─────────────────────────────────────────────────────────┐
│ COMBINING, BY THE SYSTEM, THE REDUCED PHYSICS MODEL     │
│ AND THE FULL PHYSICS MODEL TO DEFINE AN ARCHITECTURE    │ ← 914
│ THAT CAN ACHIEVE A FLOW DISTRIBUTION OF A COOLANT       │
│ BASED ON A DETERMINATION THAT THE FULL PHYSICS MODEL    │
│ COMPLIES WITH THE OPERATIONAL CONSTRAINT                │
└─────────────────────────────────────────────────────────┘

AUTONOMOUS DEVELOPMENT OF TWO-PHASE COOLING ARCHITECTURE

STATEMENT REGARDING FEDERALLY SPONSORED RESEARCH OR DEVELOPMENT

This invention was made with Government support under Contract No.: FA8650-14-C-7466 awarded by Defense Advanced Research Projects Agency (DARPA). The Government has certain rights in this invention.

BACKGROUND

The subject disclosure relates to designing a cooling structure, and more specifically, to generating models that define an architecture for two-phase cooling.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate modeling a two phase cooling structure are described.

According to an embodiment, a computer-implemented method is provided. The computer-implemented method can comprise generating, by a system operatively coupled to a processor, a reduced physics model based on a profile of a heat source and a parameter of a cooling structure. The reduced physics model can provide an output. The computer-implemented method can also comprise generating, by the system, a full physics model based on the output. Also, the computer-implemented method can comprise combining, by the system, the reduced physics model and the full physics model to define an architecture that can achieve a flow distribution of a coolant.

According to another embodiment, a computer program product is provided. The computer program product can facilitate a design of two-phase cooling structures. The computer program product can comprise a computer readable storage medium that can have program instructions embodied therewith. The program instructions can be executed by a processor to cause the processor to generate a reduced physics model based on a profile of a heat source and a parameter of a cooling structure. The reduced physics model can provide an output. Further, the program instructions can be executed by a processor to cause the processor to generate a full physics model based on the output. Also, the program instructions can be executed by a processor to cause the processor to combine the reduced physics model and the full physics model to define an architecture that can achieve a flow distribution of a coolant.

According to another embodiment, a system is provided. The system can comprise a memory that can store computer executable components. The system can also comprise a processor that can execute the computer executable components stored in the memory. The computer executable components can comprise a reduced physics model component that can generate a reduced physics model based on a profile of a heat source and a parameter of a cooling structure. The reduced physics model can provide an output. Also, the computer executable components can comprise a full physics model component that can generate a full physics model based on the output. Further, the computer executable components can comprise a combination component that can combine the reduced physics model and the full physics model to define an architecture that can achieve a flow distribution of a coolant.

BRIEF DESCRIPTION OF THE DRAWINGS

FIG. 9 illustrates a flow chart of another example, non-limiting computer-implemented method that can facilitate modeling a two-phase cooling structure in accordance with one or more embodiments described herein.

DETAILED DESCRIPTION

Figure 1:
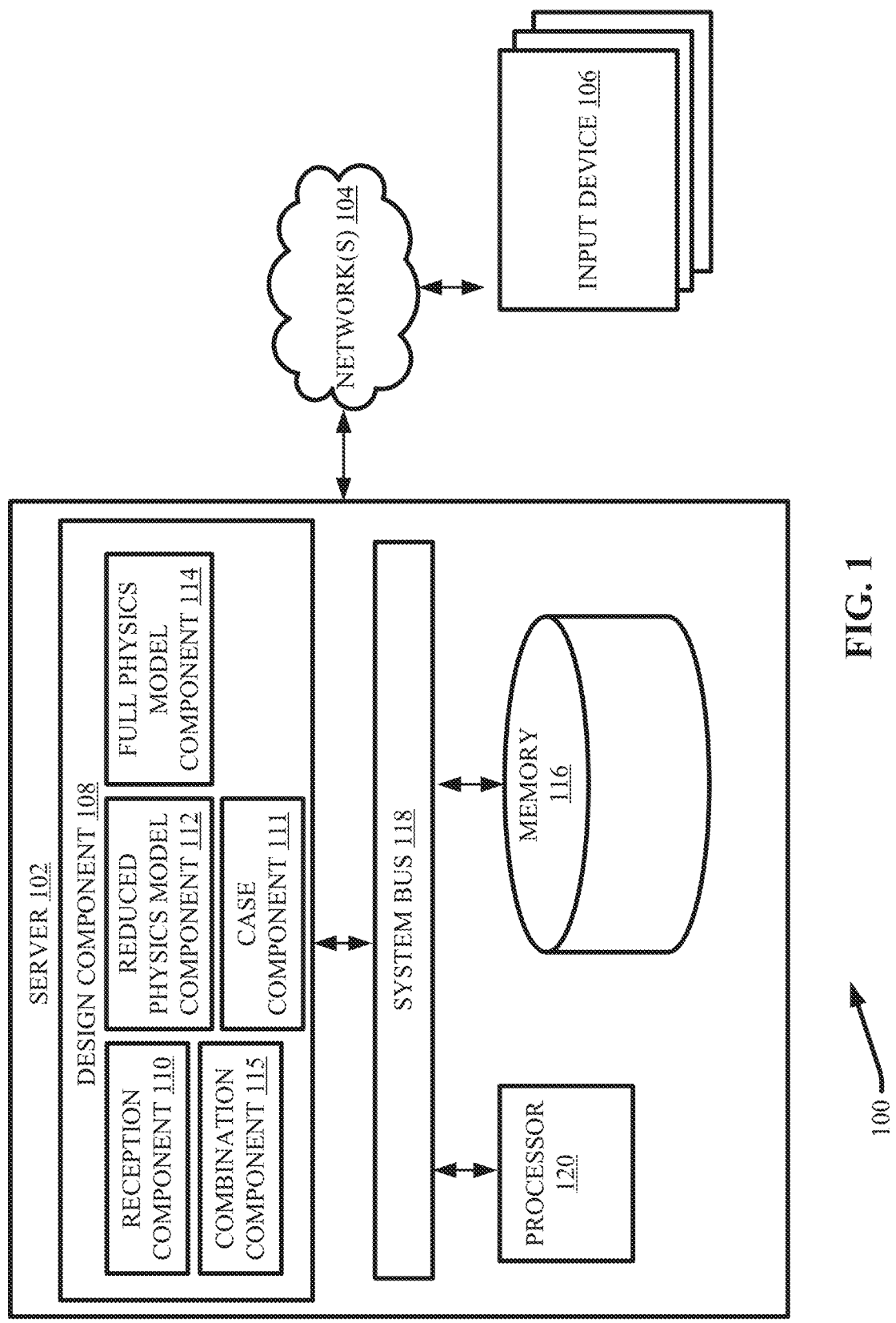
FIG. 1 illustrates a block diagram of an example, non-limiting system that can facilitate modeling a two-phase cooling structure in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Three dimensional (3D) integration of microelectronic chips into stacks is an enabling technology to provide a path for increasing computational performance. Conventional single chip cooling solutions that utilize heat sinks or cold-plates thermally coupled to the backside of a die-package cannot provide sufficient cooling for high power 3D chip stacks. To provide sufficient cooling, embedded liquid cooling architecture can be utilized, wherein a liquid coolant can be passed between the layers of stacked chips. However, such embedded liquid cooling can add a new set of constraints to the chip system (e.g., the available micron-scale cavity dimensions, working fluid, and/or operating pressures). For example, cavity heights can be limited by fabrication processes and the performance of electrical links between chips in the stack, which include through silicon vias (TSVs) between and through the layers of stacked chips. Also, a significant amount of pressure drop can be observed when a nominal amount of coolant (e.g. water) flow rate is pumped through embedded micro-channels of usable height and width. In addition, significant integrated heat load along the length (e.g., about 10 millimeters) of a processor die can cause a large temperature gradient across the channel. Moreover, the use of water as coolant can require isolation from power and signal interconnects and can cause high frequency signal transmission losses.

Given the conditions of embedded liquid cooling, some liquid cooling techniques utilize two-phase liquid cooling, wherein a chip-to-chip interconnect-compatible dielectric fluid is converted from liquid to vapor phase as it flows through embedded micron-scale cavities. The cooling can be achieved by utilizing the latent heat of vaporization of the dielectric coolant whereby, large amounts of heat can be removed with low coolant flow rates and small changes in coolant and chip temperatures across the coolant cavity/channel. Such chip-integrated micrometer scale two-phase cooling technology can be essential to fully optimize the benefits of improved integration density and modularity of 3D stacking of high performance integrated circuits (ICs). However, two-phase cooling architecture can have significant developmental challenges. One such challenge is to develop a high fidelity thermal model of a microprocessor having spatially varying heat sources together with a two-phase microfluidic convection network. The fundamental challenge is to integrate together the variations in coolant saturation temperature, local heat transfer rates, friction coefficients, and vapor quality along with complex conduction in a microprocessor package.

Various embodiments of the present invention can be directed to computer processing systems, computer-implemented methods, apparatus and/or computer program products that facilitate the efficient, effective, and autonomous (e.g., without direct human guidance) development of two-phase cooling architecture. The two-phase cooling architecture can comprise an inlet and micro-channels. Coolant can be supplied to the inlet and distributed through the micro-channels across an area subject to heat dissipating from a heat source (e.g., a processor). The coolant can be supplied to the inlet as a liquid. As the coolant is distributed through the micro-channels, the coolant can absorb latent heat, change phase, and exit the micro-channels as a vapor. The inlet can be located at the center of the heated area, and the micro-channels can extend radially from the inlet to the edges of the heated area. Various embodiments described herein can develop architecture defining the inlet and micro-channels to meet operational constraints for a desired coolant and/or a desired heat source.

For example, one or more embodiments described herein can generate a reduced physics model describing the structure of one or more micro-channels of a cooling architecture based on one or more operational constraints and/or parameters. Also, various embodiments described herein can generate a full physics model describing the structure of one or more inlets of the cooling architecture based on at least on the reduced physics model. Additionally, one or more embodiments described herein can alter constraints and/or parameters for a reduced physics model and/or a full physics model based on previously generated models.

The computer processing systems, computer-implemented methods, apparatus and/or computer program products employ hardware and/or software to solve problems that are highly technical in nature (e.g., modeling two-phase cooling architecture), that are not abstract and cannot be performed as a set of mental acts by a human. Two-phase coolant flow is an extremely complex phenomena and computationally intensive to model. One or more embodiments of the present invention can facilitate rapid optimization of cooling structure designs to achieve energy efficient two-phase cooling of micro-processors in a two dimensional (2D) as well as in a 3D configuration. For example, a human, or even multiple humans, cannot efficiently, accurately, and effectively manually compute the voluminous amounts of data describing a cooling architecture within a reasonable amount of time. By employing computer generated models, various embodiments of the present invention can substantially reduce development time restraints. Also, one or more of the models generated by the computer processing systems, computer-implemented methods, apparatus and/or computer program products employ hardware and/or software described herein can illustrate operational data (e.g., coolant flow and heat transfer) in a manner that is not readily obtainable by mere human computations. Further, by storing previously generated models, including models that failed to meet operational constraints, one or more embodiments described herein can autonomously alter constraints and/or parameters to render one or more new models feasible.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

FIG. 1 illustrates a block diagram of an example, non-limiting system 100 that can facilitate modeling a two-phase cooling structure in accordance with one or more embodiments described herein. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and one or more input devices 106. The server 102 can comprise a design component 108. The design component 108 can further comprise reception component 110, case component 111 reduced physics model component 112, full physics model component 114, and/or combination component 115. Also, the server 102 can comprise or otherwise be associated with at least one memory 116. The server 102 can further comprise a system bus 118 that can couple to various components such as, but not limited to, the design component 108 and associated components, memory 116 and/or a processor 120. While a server 102 is illustrated in FIG. 1, in other embodiments, multiple devices of various types can be associated with or comprise the features shown in FIG. 1.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the design component 108 can be provided on the one or more servers 102, it should be appreciated that the architecture of system 100 is not so limited. For example, the design component 108, or one or more components of design component 108, can be located at another computer device, such as another server device, a client device, etc.

The one or more input devices 106 can be a computer device and/or a means to enter data into a computer device. Example input devices 106 include, but are not limited to: a personal computer, a keyboard, a mouse, a computer tablet (e.g., a tablet comprising a processor and operating system), a smartphone, and/or a website. The input device 106 can be operably coupled to the server 102, and/or the input device 106 can communicate with the server 102 via one or more networks 104.

In various embodiments, an entity can input design data into the input device 106 regarding: one or more heat source profiles, one or more operational constraints, and/or one or more parameters of a cooling structure. The one or more heat source profiles can comprise information regarding a heat source (e.g., a microprocessor) that can supply the heat that the cooling architecture being modeled can be designed to dissipate. For example, a heat source profile can indicate, but is not limited to indicating: a type of heat source (e.g., a microprocessor), manufacturing data of the heat source (e.g., brand and/or model), a workload power dissipation for the heat source, and/or a temperature limit of the heat source (e.g., a maximum temperature at which the heat source can sustain functionality).

The one or more operational constraints can comprise information regarding operational characteristics of the desired cooling architecture subject to modeling. An operational constraint can describe desired performance criteria to be exhibited by the cooling architecture subject to modeling. Examples of one or more operational constraints can include, but are not limited to: coolant specification (e.g., type of coolant that can be utilized in the cooling architecture subject to modeling), coolant characteristics (e.g., physical properties of the type of coolant that can be utilized in the cooling architecture subject to modeling), a pressure drop limit (e.g., a maximum change in pressure that can be experienced in the cooling architecture subject to modeling), a desired exit vapor quality (e.g., physical characteristics of the vapor exiting the micro-channels of the cooling architecture subject to modeling), and/or a coolant pumping power (e.g., the power and/or pressure the coolant can be subject to in order to supply the coolant to the inlet and/or micro-channels of the cooling architecture subject to modeling).

The one or more parameters can comprise information regarding operational and/or structural parameters of one or more cooling structures in the architecture subject to modeling that can be changed in order to meet one or more operational constraints in relation to one or more heat profiles. For example, the parameter can describe: a mass flow rate of the coolant in the cooling architecture subject to modeling, channel dimensions of the inlet and/or micro-channels of the cooling architecture subject to modeling, and/or layout of the inlet and/or micro-channels of the cooling architecture subject to modeling. For instance, channel dimensions of the inlet and/or micro-channels of the cooling architecture subject to modeling can include, but are not limited to: length, width, height, and/or taper angle of one or more inlets; and/or length, width, height, and/or taper angle of one or more micro-channels.

In another instance, layout of the inlet and/or micro-channels of the cooling architecture subject to modeling can include, but are not limited to: the number of inlets in the cooling architecture subject to modeling, the number of micro-channels in the cooling architecture subject to modeling, the position of the one or more inlets in the cooling architecture subject to modeling (e.g., the inlets can be located in a center position of the cooling architecture subject to modeling), the position of the one or more micro-channels in the cooling architecture subject to modeling (e.g., the micro-channels can extend radially from the inlet to the perimeter of the heated area covered by the cooling architecture subject to modeling), the orientation of one or more micro-channels in the cooling architecture subject to modeling, the number of layers of the cooling architecture subject to modeling that comprise micro-channels, and/or which micro-channels are located on which layers of the cooling architecture subject to modeling.

The reception component 110 can receive the design data inputted into the input device 106. The reception component 110 can be operably coupled to the server 102, and/or the reception component 110 can communicate with the server 102 via one or more networks 104. For example, the reception component 110 can receive information regarding the one or more heat source profiles, one or more operational constraints, and/or one or more variable parameters.

The case component 111 can define one or more cases based on at least a heat source profile and/or one or more parameters. The case component 111 can define one or more cases based on a parameter (e.g., channel dimensions) of a cooling structure (e.g., micro-channels of a subject cooling architecture). For example, the reception component 110 can receive multiple parameters and the case component 111 can define multiple cases, wherein each case can comprise a distinct parameter and/or a combination of the parameters. The one or more cases defined by the case component 111 can be subject to modeling by the reduced physics model component 112.

Further, the case component 111 can define one or more second cases based on a second parameter (e.g., orifice length) of a second cooling structure (e.g., an inlet of the subject cooling architecture). For example, the reception component 110 can receive multiple parameters that include one or more second parameters, and the case component 111 can define multiple second cases, wherein each second case can comprise a distinct second parameter and/or a combination of the second parameters. The one or more second cases defined by the case component 111 can be subject to modeling by the full physics model component 114.

The reduced physics model component 112 can generate a first model defining structural and/or operational characteristics of one or more first cooling structures (e.g., micro-channels) in the subject cooling architecture based on the data received by the reception component 110. The reduced physics model component 112 can be operably coupled to the reception component 110, and/or the reduced physics model component 112 can communicate with the reception component 110 via one or more networks 104.

Figure 2:
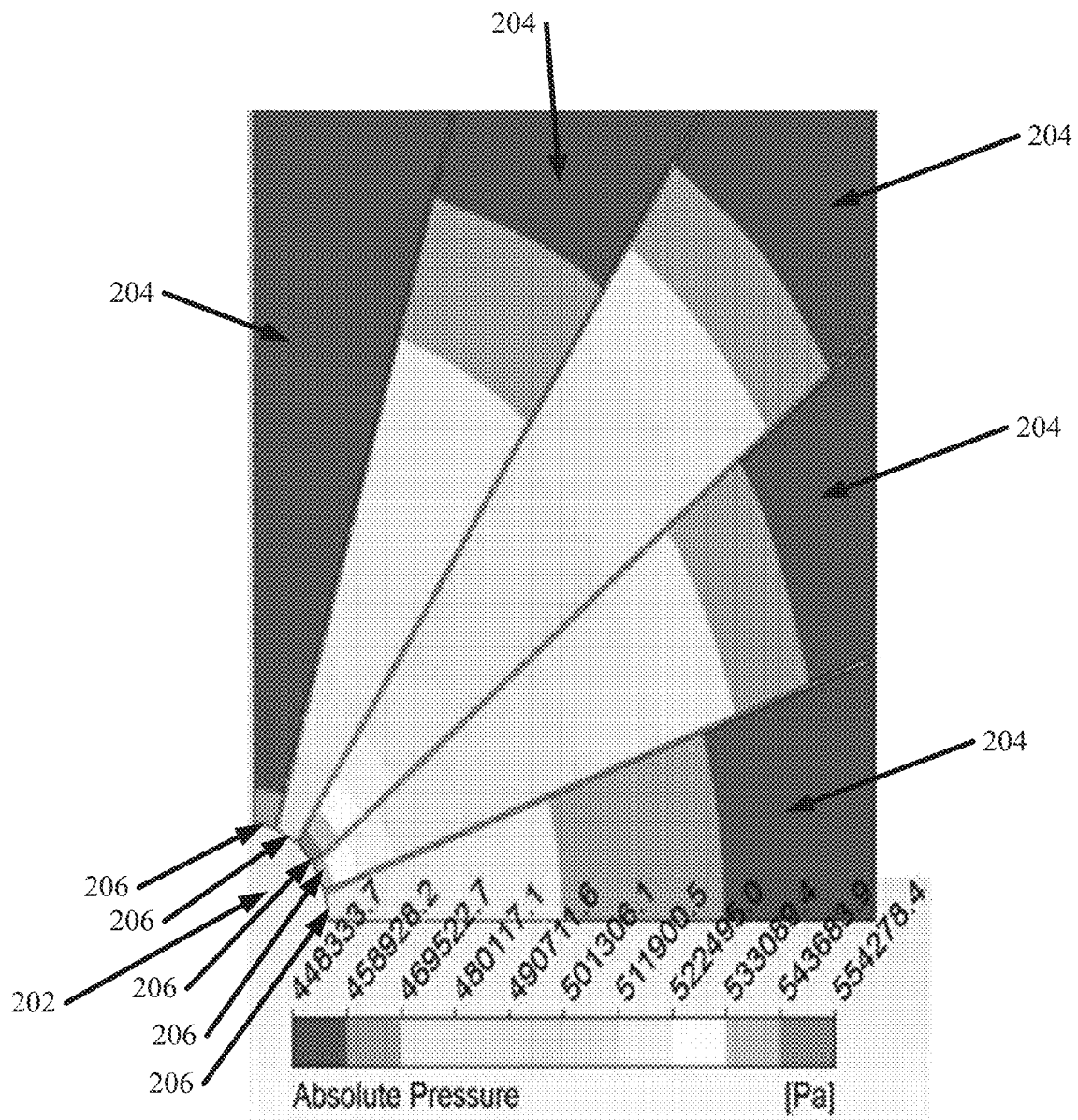
FIG. 2 illustrates a diagram of an example, non-limiting reduced physics model that can be generated in accordance with one or more embodiments described herein.

FIG. 2 illustrates a diagram of an example, non-limiting first model (e.g., a reduced physics model) that can be generated by the reduced physics model component 112. Repetitive description of like elements employed in other embodiments described herein is omitted for sake of brevity. As shown in FIG. 2 the reduced physics model can be a cross-sectional averaged model in which the fluid domain can be expressed in one dimension (1D) or 2D. Further the reduced physics model component 112 can illustrate heat transfer and/or fluid pressure of the coolant as it is distributed from an inlet manifold 202 (e.g., an inlet of a two-phase cooling architecture) and through one or more cooling channels 204 (e.g., micro-channels of a of a two-phase cooling architecture).

For example, the reduced physics model component 112 can calculate two-phase friction pressure drop of the coolant within the cooling channels of a subject cooling architecture by utilizing Equations 1-4.

$$\Delta p_{fric} = \Phi^2 \Delta p_l \quad (1)$$

$$\Phi_{TT}^2 = 1 + \frac{C}{X} + \frac{1}{X^2} \quad (2)$$

$$X = \quad (3)$$

$$\begin{cases} \left(\frac{16}{0.046}\right)^{0.5} Re_v^{-0.4} \left(\frac{G_l}{G_v}\right)^{0.5} \left(\frac{\rho_v}{\rho_l}\right)^{0.5} \left(\frac{\mu_l}{\mu_v}\right)^{0.5} & Re_l < 1000 \; Re_v > 1000 \\ \left(\frac{1-x}{x}\right)^{0.9} \left(\frac{\rho_v}{\rho_l}\right)^{0.5} \left(\frac{\mu_l}{\mu_v}\right)^{0.1} & Re_l > 1000 \; Re_v > 1000 \end{cases}$$

$$Re_l = \frac{G_l D_h}{\mu_l} \quad Re_v = \frac{G_v D_h}{\mu_v} \quad (4)$$

Where "Δp" can represent an increment of pressure in kilo-pascals (kPa), subscript "fric" indicates frictional, "Φ" can represent a pressure correction factor, subscript "l" can indicate liquid phase of the coolant, "X" can represent a Lockhart-Martinelli Parameter, "Re" can represent Reynolds Number, subscript "v" can indicate vapor phase of the coolant, "G" can represent mass flux of the coolant in kilograms per meters squared times seconds (kg/m²s), "ρ" can represent density of the coolant in kilograms per meter cubed (kg/m³), "μ" can represent viscosity of the coolant in pascals times seconds (Pas), and "D" can represent hydraulic diameter. Also, "C" can be defined with respect to the fluid behavior of the coolant, wherein a coolant with an Re of less than 1000 can be considered laminar, and a coolant with an Re of greater than 1000 can be considered turbulent. Below, Table 1 provides values for "C" based on the fluid behavior of the coolant for each phase.

TABLE 1

| Liquid Phase | Vapor Phase | "C" Value |
|---|---|---|
| Turbulent | Turbulent | 20 |
| Laminar | Turbulent | 12 |
| Turbulent | Laminar | 10 |
| Laminar | Laminar | 5 |

In another example, the reduced physics model component 112 can calculate two-phase heat transfer rates by utilizing Equations 5-6.

$$h_{pool} = 207 \frac{\lambda_l}{d_b} \left(\frac{qd_b}{\lambda_l T_l}\right)^{0.745} \left(\frac{\rho_v}{\rho_l}\right)^{0.581} Pr_l^{0.533} \quad (5)$$

$$d_b = 0.51 \left[\frac{2\sigma}{g(\rho_l - \rho_v)}\right]^{0.5} \quad (6)$$

Where "h" can represent a heat transfer coefficient in watts per meter squared times Kelvin (W/m²K), subscript "pool" can indicate pool boiling point, "λ" can indicate thermal conductivity in watts per meter times Kelvin (W/mK), subscript "b" can indicate a bubble, "T" can represent temperature of the coolant in Kelvin (K), "Pr" can represent the Prandtl number, "g" can represent a gravitational constant in meters per second squared (m/s²), and "σ" can represent surface tension of the coolant in Newton per meter (N/m).

Further, the reduced physics model component 112 can model the structural features of the one or more cooling channels 204 in 3D. For example, the first model (e.g., reduced physics model) can illustrate and/or describe: the number of cooling channels 204 in the subject model; the height, length, and/or width of the cooling channels 204 in the subject model; the orientation and/or placement of the cooling channels 204 in the subject model; the structure and/or position of one or more pins located in the cooling channels 204 of the subject model; and/or the tapering angles of one or more cooling channels 204 in the subject model.

In one or more embodiments, the reduced physics model component 112 can generate one or more first models based on the heat source profile and one or more parameters received by the reception component 110. For example, the one or more parameters can regard a cooling structure of the subject architecture (e.g., one or more cooling channels 204). Additionally, in various embodiments the reduced physics model component 112 can generate the one or more first models based further on the one or more operational constraints.

Further, the reduced physics model component 112 can determine the feasibility of the generated first models based on the operational constraints received by the reception component 110. For example, the reduced physics model component 112 can determine the structural and/or operational characteristics that are described by the received operational constraints. The reduced physics model component 112 can compare the determined structural and/or operational characteristics of a subject first model with the operational constraints to determine whether the first model complies with the operational constraints. Additionally, the reduced physics model component 112 can determine whether the first model (e.g., reduced physics model) is capable of functioning at the given parameters.

In addition, the reduced physics model component 112 can generate one or more outputs from each of the first models that are determined feasible. The output can described desired conditions to maintain the feasibility of the first model. Example outputs can include, but are not limited to: mass flow rate required for feasibility, expected pressure drop, expected exit vapor quality, and/or expected heat source temperature. For example, the reduced physics model component 112 can determine the expected exit vapor quality by utilizing Equation 7.

$$x = (\varphi + C_{p,liq} * (T_{sat,inlet} - T_{sat}))/h_{LV} \quad (7)$$

Where "x" represents vapor quality (e.g., mass fraction of vapor), "φ" can represent an additional variable in joules per kilogram (J/kg), subscript "liq" can indicate liquid phase, "*" represents the mathematical symbol for convolution, subscript "sat, inlet" can indicate saturation at inlet conditions, subscript "sat" can indicate local saturation, and "$h_{LV}$" can represent the latent heat of vaporization of the coolant.

The full physics model component 114 can generate a second model (e.g., a full physics model) based on the first model and the one or more outputs generated by the reduced physics model component 112. Additionally, the full physics model component 114 can generate the second model based further on one or more parameters regarding a cooling structure in the subject architecture (e.g., the inlet manifold 202). The second model (e.g., a full physics model) can define an architecture that can achieve a flow distribution of a coolant. For example, the full physics model component 114 can generate a second model that illustrates and/or describes dimensions of the inlet manifold 202 (e.g., width, and/or length) and/or the dimensions (e.g., width, length and/or angle) of one or more inlet orifices 206 that allow fluid communication between the inlet manifold 202 and the cooling channels 204. Example inlet orifices can include, but are not limited to: straight slots, tapered slots, and/or pins.

Figure 3:
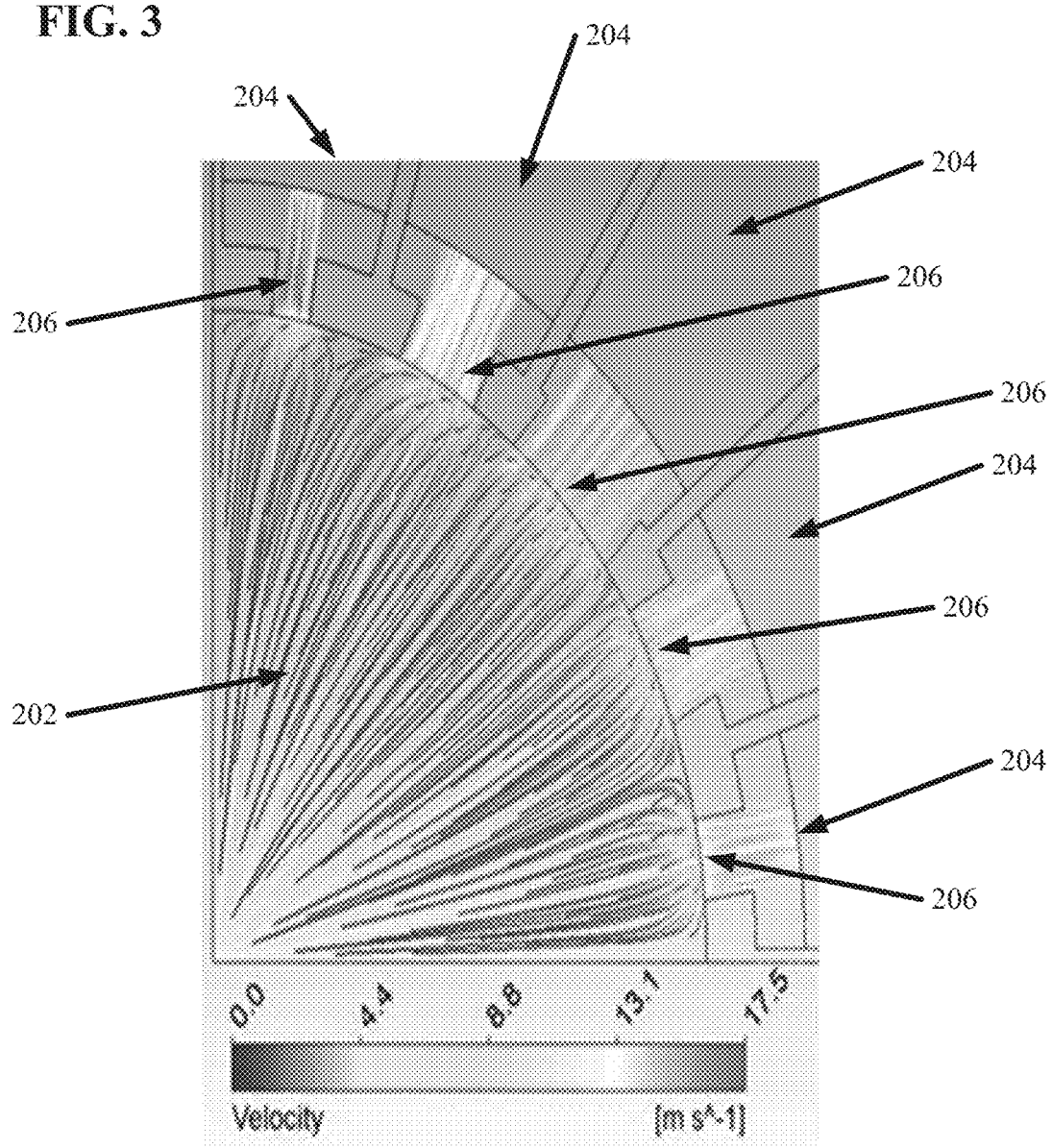
FIG. 3 illustrates a diagram of an example, non-limiting full physics model that can be generated in accordance with one or more embodiments described herein.

FIG. 3 illustrates an example, non-limiting full physics model that can be generated by the full physics model component 114. Repetitive description of like elements employed in other embodiments described herein is omitted for sake of brevity. In various embodiments, the full physics model component 114 can utilize conservation equations for continuity, momentum, and/or energy for each phase and/or turbulence of the coolant.

For example, the full physics model component 114 can utilize Equation 8 to calculate conservation of momentum.

$$\nabla \cdot (\rho U \otimes U) = -\nabla p + \nabla \cdot (\mu(\nabla U + (\nabla U)^T - \tfrac{2}{3}\delta \nabla \cdot U)) + s_M \quad (8)$$

Where "$\otimes$" can be the mathematical symbol for tensor product, "U" can represent a velocity vector of the coolant in meters per second (m/s), and "$S_M$" can represent the momentum source term. The momentum source term can enforce a pressure gradient profile for the coolant. Also, the full physics model component 114 can utilize Equation 9 to calculate continuity.

$$\nabla \cdot (\rho UH) = \nabla (\lambda \nabla T) + s_E \quad (9)$$

Further, the full physics model component 114 can utilize Equations 10 and 11 to calculate conservation of energy.

$$\nabla \cdot (\rho UH) = \nabla \cdot (\lambda \nabla T) + s_E \quad (10)$$

$$\nabla \cdot (\rho U \varphi) = \nabla \cdot (\rho A_\varphi \nabla \varphi) + S_\varphi \quad (11)$$

Where "H" can represent the coolant specific enthalpy in joules per kilogram (J/kg), and "$S_E$" represents an energy source/sink term, "$A\varphi$" can represent kinematic diffusion of the additional variable, and "$S\varphi$" can represent the source term applied only at fluid-solid boundaries to transfer thermal information. Equation 11 can be utilized in conjunction with Equation 10 in order to track the coolant enthalpy evolution as the coolant is distributed through the cooling architecture.

In various embodiments, the second model generated by the full physics model component 114 can define the structural characteristics the inlet manifold 202 and the fluid communication between the inlet manifold 202 and the cooling channels 204 of the subject cooling architecture. Also, the full physics model component 114 can determine the feasibility of the second model (e.g., full physics model) based on the one or more operational constraints received by the reception component 110. For example, the full physics model component 114 can determine the structural and/or operational characteristics that are described by the received operational constraints. The full physics model component 114 can compare the determined structural and/or operational characteristics of a subject second model with the operational constraints to determine whether the second model complies with the operational constraints. Additionally, the full physics model component 114 can determine whether the second model (e.g., full physics model) is capable of functioning at the given parameters. Thus, the full physics model component 114 can generate a feasible full physics model that is: based on the reduced physics model, meets the requirements indicated by the output of the reduced physics model, and meets the operational constraints.

In one or more embodiments, the combination component 115 can combine a feasible first model (e.g., reduced physics model) with a feasible second model (e.g., full physics model) that was generated based on the first model in order to create a complete model that represents the total cooling architecture. Since the reduced physics model can represent feasible architecture of cooling channels 204 and the full physics model can represent feasible architecture of an inlet manifold 202 and fluid communication between the inlet manifold 202 and the cooling channels 204, combination of a feasible reduced physics model and a feasible full physics model can define architecture that can achieve a desired flow distribution of a coolant. By generating the first model and second model in stages, rather than generating a single complete model all at once, one or more embodiments of the present invention can increase efficiency (e.g., reduce development time) of generating the complete model at least because parameters that render a cooling architecture infeasible can be readily identified in generation of the first model wherein minimal amount of resources (e.g., time) have been spent.

Figure 4:
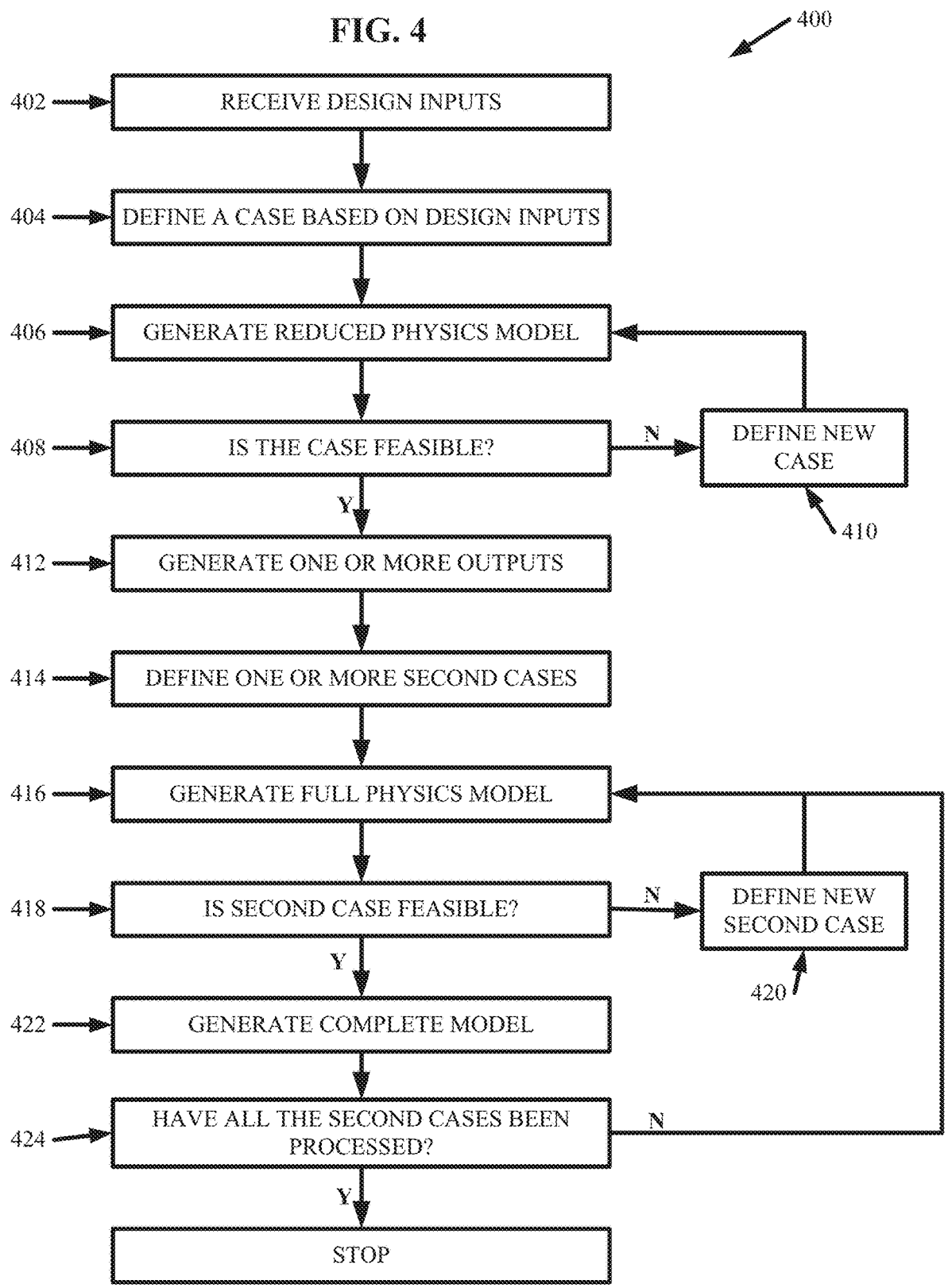
FIG. 4 illustrates a flow chart of an example, non-limiting method that can facilitate modeling a two-phase cooling structure in accordance with one or more embodiments described herein.

FIG. 4 illustrates a flow diagram of an example, non-limiting method 400 that can be performed by the system 100. Repetitive description of like elements employed in other embodiments described herein is omitted for sake of brevity. At 402 of method 400, design inputs (e.g., heat source profiles, operational constraints, and/or parameters) can be received (e.g., via reception component 110). At 404 of method 400, cases can be defined (e.g., via the case component 111) based on the design inputs. At 406 of method 400, a reduced physics model can be generated for a defined case (e.g., via the reduced physics model component 112). At 408 of method 400, feasibility of the case can be determined with regard to the generated reduced physics model (e.g., via the reduced physics model component 112). For example, the reduced physics model component 112 can determine whether the reduced physics model can meet the operational constraints of the design input.

If it is determined (e.g., via the reduced physics model component 112) that the subject case is not feasible then the method 400 can proceed to 410. At 410, a new case can be defined (e.g., via case component 111) based on the design inputs and the method 400 can proceed again from 406. If it is determined (e.g., via the reduced physics model component 112) that the subject case is feasible (e.g., remains functional while meeting the operational constraints), then the method 400 can proceed to 412 and one or more outputs can be generated (e.g., via the reduced physics model component 112) based on the reduced physics model.

At 414 of method 400, one or more second cases can be defined (e.g., via case component 111) corresponding to the feasible case and based on one or more of the parameters of the design input. At 416 of method 400, a full physics model can be generated for the second case (e.g., via the full physics model component 114). At 418 of method 400, feasibility of the second case can be determined with regard to the generated full physics model (e.g., via the full physics model component 114). For example, the full physics model component 114 can determine whether the full physics model can meet the operational constraints of the design input while maintain functionality.

If it is determined (e.g., via the full physics model component 114) that the subject second case is not feasible then the method 400 can proceed to 420. At 420, a new second case can be defined (e.g., via case component 111) and the method 400 can proceed again from 416. If it is determined (e.g., via the full physics model component 114) that the subject second case is feasible (e.g., remains functional while meeting the operational constraints), then the method 400 can proceed to 422. At 422 the feasible reduced physics model and the feasible full physics model generated based on the reduced physics model can be combined (e.g., via combination component 115) to generate a complete model that can represent the architect that can achieve a desired coolant distribution.

At 424 it can be determined whether a full physics model has been generated for all the defined second cases. If it is determined that a full physics model has not been generated for all the defined second cases, then the method 400 can proceed to 416 and can generate a full physics model (e.g., via the full physics model component 114) for one of the defined second cases that has not been subjected to a full physics model. If it is determined that a full physics model has been generated for all the defined second cases, then the method 400 can be complete.

Figure 5:
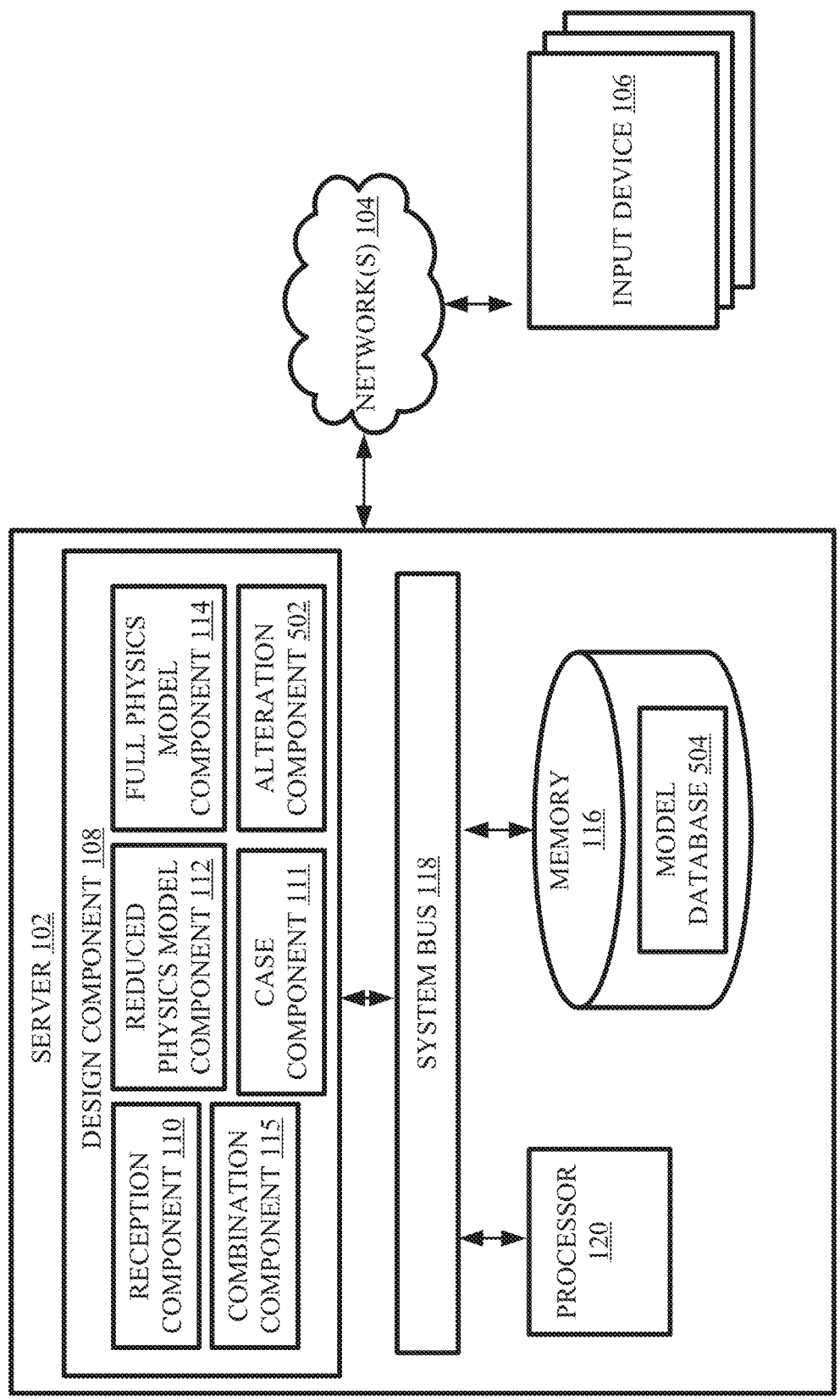
FIG. 5 illustrates a block diagram of another example, non-limiting system that can facilitate modeling a two-phase cooling structure in accordance with one or more embodiments described herein.

FIG. 5 illustrates a block diagram on another example, non-limiting system 100 that can further comprise an alteration component 502 and a model database 504. Repetitive description of like elements employed in other embodiments described herein is omitted for sake of brevity. The alteration component 502 can be operably coupled to the reduced physics model component 112 and/or the full physics model component 114, and/or the alteration component 502 can communicate with the reduced physics model component 112 and/or the full physics model component 114 via one or more networks 104.

In one or more embodiments, the alteration component 502 can utilize artificial intelligence (AI) techniques (e.g., neural networks, genetic algorithms, and/or reinforcement learning) to generate one or more alterations to one or more parameters. By generating one or more alterations, the alteration component 502 can define a new case or second case in response to the subject case or second case being determined infeasible (e.g., via the reduced physics model component 112 and/or the full physics model component 114). The model database 504 can be stored in the memory 116 and can comprise each first model (e.g., reduced physics model) and/or second model (e.g., full physics model) generated by the reduced physics model component 112 and/or the full physics model component 114 (despite whether the subject model was determined feasible or not). The alteration component 502 can learn from the one or more models comprising the model database 504 to make alterations to a subject case (e.g., to one or more parameters of the subject case) that is determined infeasible, wherein the alteration component 502 can implement the alterations to define a new case and/or a new second case.

For example, the alteration component 502 can analyze one or more models from the model database 504 to determine relationships between characteristics of the models and the subject parameters of the models. For instance, in regards to case that was determined infeasible based on its reduced physics model, the alteration component 502 can suggest alterations to one or more dimension and/or layout of the cooling channels 204. In another instance, in regards to second case that was determined infeasible based on its full physics model, the alteration component 502 can suggest alterations to one or more dimension and/or layout of the inlet manifold 202. From the determined relationships, the alteration component 502 can generate alterations to the parameters of a subject case to define a new case. Example, alterations that can be generated by the alteration component 502 can include, but are not limited to: altering the number of cooling channels 204, altering the dimensions of one or more cooling channels 204 (e.g., height, length, and/or width), altering the orientation of one or more cooling channels 204, altering the number of inlet manifolds 202, altering the dimensions of the inlet manifold 202 (e.g., width and/or length), altering the type and/or number of inlet orifice 206 that facilitates fluid communication between the inlet manifold 202 and the one or more cooling channels 204, altering the number of layers in the cooling architecture that comprise cooling channels 204, altering the expansion of the cooling channels 204, and/or altering the number of pins included in the cooling channels 204.

Figure 6:
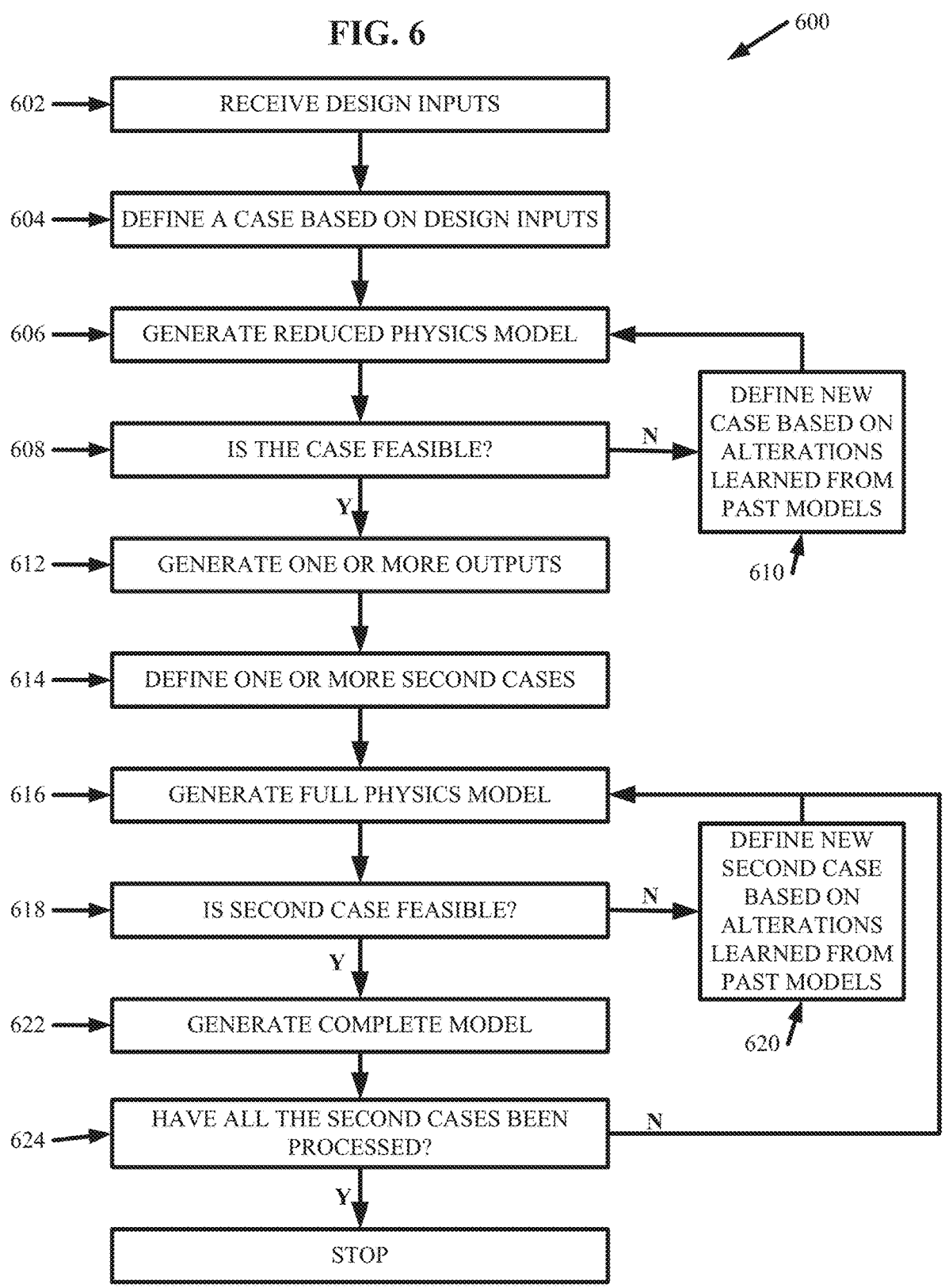
FIG. 6 illustrates a flow chart of another example, non-limiting method that can facilitate modeling a two-phase cooling structure in accordance with one or more embodiments described herein.

FIG. 6 illustrates a flow diagram of an example, non-limiting method 600 that can be performed by the system 100. Repetitive description of like elements employed in other embodiments described herein is omitted for sake of brevity. At 602 of method 600, design inputs (e.g., heat source profiles, operational constraints, and/or parameters) can be received (e.g., by reception component 110). At 604 of method 600, cases can be defined based on the design inputs (e.g., via case component 111). At 606 of method 600, a reduced physics model can be generated for a defined case (e.g., via the reduced physics model component 112). At 608 of method 600, feasibility of the case can be determined with regard to the generated reduced physics model (e.g., via the reduced physics model component 112). For example, the reduced physics model component 112 can determine whether the reduced physics model can meet the operational constraints of the design input.

If it is determined (e.g., via the reduced physics model component 112) that the subject case is not feasible then the method 600 can proceed to 610. At 610, a new case can be defined based on one or more alterations learned from one or more past models (e.g., via the alteration component 502) and the method 600 can proceed again from 606. If it is determined (e.g., via the reduced physics model component 112) that the subject case is feasible (e.g., remains functional while meeting the operational constraints), then the method 600 can proceed to 612 and one or more outputs can be generated (e.g., via the reduced physics model component 112) based on the reduced physics model.

At 614 of method 600, one or more second cases can be defined (e.g., via the case component 111) corresponding to the feasible case and based on one or more of the parameters of the design input. At 616 of method 600, a full physics model can be generated for the second case (e.g., via the full physics model component 114). At 618 of method 600, feasibility of the second case can be determined with regard to the generated full physics model (e.g., via the full physics model component 114). For example, the full physics model component 114 can determine whether the full physics model can meet the operational constraints of the design input while maintain functionality.

If it is determined (e.g., via the full physics model component 114) that the subject second case is not feasible then the method 600 can proceed to 620. At 620, a new second case can be defined based on one or more alterations learned from one or more past models (e.g., via the alteration component 502) and the method 600 can proceed again from 616. If it is determined (e.g., via the full physics model component 114) that the subject second case is feasible (e.g., remains functional while meeting the operational constraints), then the method 600 can proceed to 622. At 622 the feasible reduced physics model and the feasible full physics model generated based on the reduced physics model can be combined (e.g., via combination component 115) to generate a complete model that can represent the architect that can achieve a desired coolant distribution.

Also, the performance characteristics can be displayed in an easily readable format such as, but not limited to: a list, a table, a chart, and/or a graph.

Below, Table 2 provides an example, non-limiting, performance characteristic table comprising information that can be received and/or generated by the design component 108 and can be displayed by the display component 702.

TABLE 2

| Coolant: | R1234ze | | | |
|---|---|---|---|---|
| Liquid Phase: | $\rho_l = 11464$ kg/m$^3$ | $C_{pl} = 1402.9$ J/kg · K | $\mu_l = 1.88e^{-4}$ Pa · s | $\lambda_l = 0.0725$ W/m · K |
| Vapor Phase: | $\rho_v = 30.52$ kg/m3 | $C_{pv} = 998.57$ J/kg · K | $\mu_v = 1.24e^{-5}$ Pa · s | $\lambda_l = 0.014$ W/m · K |
| Latent Heat: | $H_{lv} = 163060$ J/kg | | | |
| Saturation Temperature | $T_{sat}[C] = 55.8426 * \left(\frac{P_{abs}}{1[\text{MPa}]}\right)^3 - 137.2327 * \left(\frac{P_{abs}}{1[\text{MPa}]}\right)^2 + 161.6659 * \left(\frac{P_{abs}}{1[\text{MPa}]}\right) - 28.39$ | | | |
| Chip: | Silicon | | | |
| Chip Properties: | $\rho = 2230$ kg/m$^3$ | $C_p = 703$ J/kg · K | $\lambda = 149$ W/m · K | |
| Cover Plate: | Glass | | | |
| Cover Plate Properties: | $\rho = 2230$ kg/m$^3$ | $C_p = 753.12$ J/kg · K | $\lambda = 1.1$ W/m · K | |

At 624, it can be determined whether a full physics model has been generated for all the defined second cases. If it is determined that a full physics model has not been generated for all the defined second cases, then the method 600 can proceed to 616 and can generate a full physics model (e.g., via the full physics model component 114) for one of the defined second cases that has not been subjected to a full physics model. If it is determined that a full physics model has been generated for all the defined second cases, then the method 600 can be complete.

Figure 7:
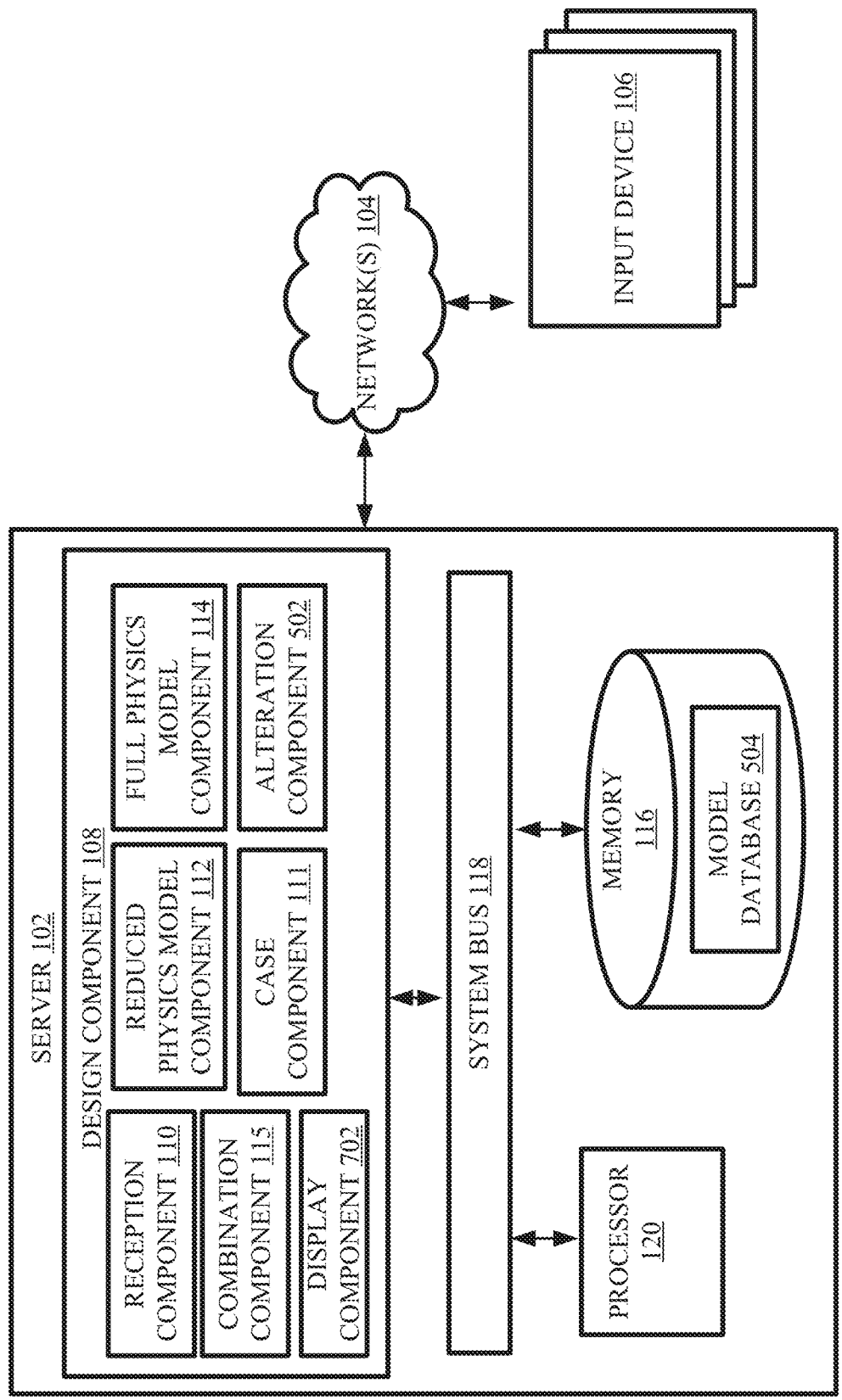
FIG. 7 illustrates a block diagram of another example, non-limiting system that can facilitate modeling a two-phase cooling structure in accordance with one or more embodiments described herein.

FIG. 7 illustrates a block diagram on another example, non-limiting system 100 that can further comprise a display component 702. Repetitive description of like elements employed in other embodiments described herein is omitted for sake of brevity. The display component 702 can be operably coupled to the design component 108, and the design component's 108 associated components, and/or the display component 702 can communicate with the design component 108, and the design component's 108 associated components, via one or more networks 104.

In one or more embodiments, the display component 702 can display one or more of the first models (e.g., reduced physics models) and/or one or more of the second models (e.g., full physics models) on a screen. The screen can be operably coupled to the display component 702, and/or the screen can communicate with the display component 702 via one or more networks 104. The display component 702 can display the first and/or second models as digital images illustrating 3D or 2D views.

In various embodiments, the display component 702 can further display performance characteristics regarding a subject model (e.g., a reduced physics model, a full physics model, and/or a complete model) that were received by the reception component 110, generated by the reduced physics model component 112, and/or generated by the full physics model component 114. The performance characteristics can include, but are not limited to: information regarding a heat source profile, information regarding one or more operational constraints, information regarding one or more parameters, information regarding one or more structural characteristics of the subject model, and/or one or more coolant distribution characteristics achieved by the subject model.

Where "coolant" can refer to the type of coolant utilized in the cooling architecture represented by the subject model; "liquid phase" can refer to characteristics of the coolant while the coolant is in a liquid phase; "vapor phase" can refer to characteristics of the coolant while the coolant is in a vapor phase; "latent heat" can refer to the latent heat of the coolant; "saturation temperature can refer to the saturation temperature of the coolant, wherein subscript "abs" indicates absolute; "MPa" can refer to mega pascals; "chip" can refer to the type of chip which the cooling architect will be positioned upon; "chip properties" can refer to properties of the chip; "cover plate" can refer the type of plate that can cover the top most layer of the cooling architecture that comprises cooling channels 204; and "cover plate properties" can refer to properties achieved by the cover plate.

Figure 8:
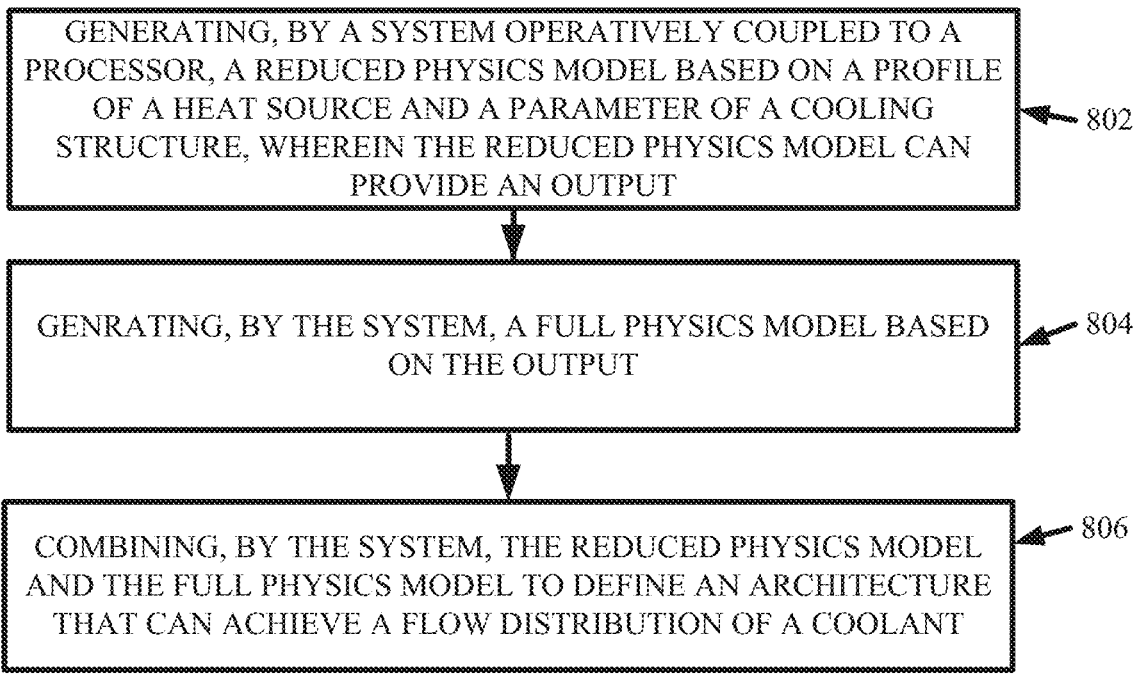
FIG. 8 illustrates a flow chart of an example, non-limiting computer-implemented method that can facilitate modeling a two-phase cooling structure in accordance with one or more embodiments described herein.

FIG. 8 illustrates a flow diagram of an example, non-limiting computer-implemented method 800 that can facilitate modeling a two phase cooling structure in accordance with one or more embodiments described herein. Repetitive description of like elements employed in other embodiments described herein is omitted for sake of brevity. At 802, the method 800 can comprise generating, by a system 100 operatively coupled to a processor 120, a reduced physics model based on a profile of a heat source and a parameter of a cooling structure. The reduced physics model can provide an output. At 804, the method 800 can also comprise generating, by the system 100, a full physics model based on the output. Further, at 806 the method 800 can comprise combining, by the system 100, the reduced physics model and the full physics model to define an architecture that can achieve a flow distribution of a coolant.

FIG. 9 illustrates a flow diagram of another example, non-limiting computer-implemented method 900 that can facilitate modeling a two phase cooling structure in accordance with one or more embodiments described herein. Repetitive description of like elements employed in other embodiments described herein is omitted for sake of brevity. At 902, the method 900 can comprise generating (e.g., via reduced physics model component 112), by a system 100 operatively coupled to a processor 120, a reduced physics model based on a profile of a heat source and a parameter of a cooling structure (e.g., one or more cooling channels 204). The reduced physics model can provide an output. At 904, the method 900 can comprise determining (e.g., via reduced physics model component 112), by the system 100, whether the reduced physics module complies with an operational constraint. At 906, the method 900 can comprise altering (e.g., via alteration component 502), by the system 100, the parameter based on a determination (e.g., via reduced physics model component 112) that the reduction physics model does not comply with the operational constraint. At 908, the method 900 can further comprise generating (e.g., via full physics model component 114), by the system 100, a full physics model based on the output and a second parameter of a second cooling structure (e.g., inlet manifold 202). Further, at 910 the method 900 can comprise determining (e.g., via full physics model component 114), by the system 100, whether the full physics model complies with an operational constraint. At 912, the method 900 can comprise altering (e.g., via alteration component 502), by the system 100, the second parameter based on a determination that the full physics model does not comply with the operations constraint. Moreover, at 914 the method 900 can comprise combining (e.g., via combination component 115), by the system 100, the reduced physics model and the full physics model to define an architecture that can achieve a flow distribution of a coolant based on a determination (e.g., via full physics model component 114) that the full physics model complies with the operational constraint.

Figure 10:
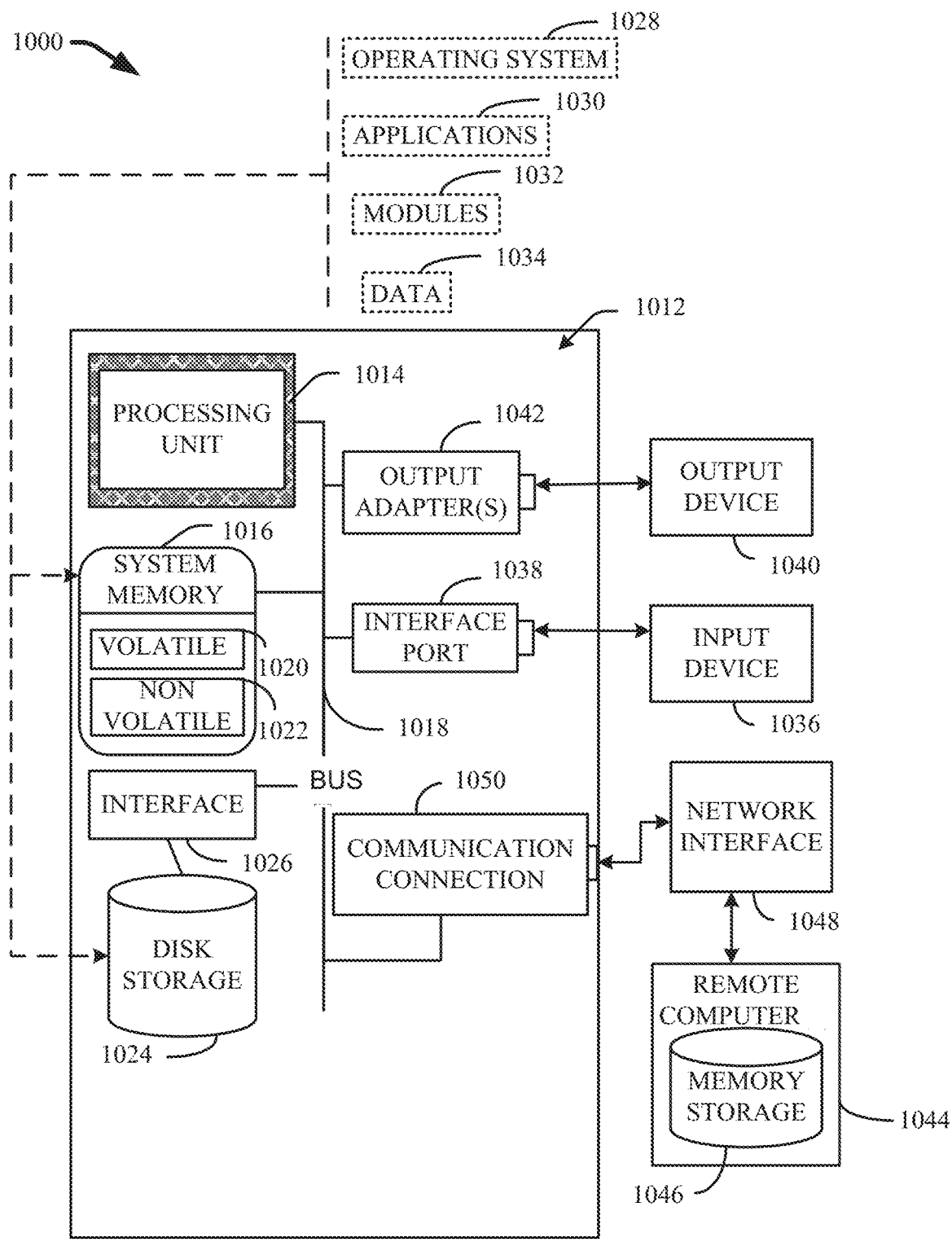
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   iteratively performing, by a system operatively coupled to a processor, a first set of operations until a reduced physics model is determined to be feasible, where the first set of operations comprise:
   generating the reduced physics model based on a profile of a heat source, one or more operational constraints for cooling the heat source, and one or more parameters related to designing a two-phase cooling structure that is three-dimensional, wherein the reduced physics model defines an architecture of cooling channels of the two-phase cooling structure using a first subset of the one or more parameters, and the reduced physics model models a fluid domain of the cooling channels in one dimension or two dimensions, and models structural features of the cooling channels in three dimensions,
   determining whether the reduced physics model is feasible based on the one or more operational constraints,
   in response to a determining that the reduced physics model is not feasible, altering at least one parameter of the first subset, and
   in response to determining that the reduced physics model is feasible, generating at least one output that maintains a defined thermal performance of the reduced physics model with respect to the one or more operational constraints, and the at least one output is selected from a group consisting of a mass flow rate, a pressure drop, and an exit vapor quality, and;
   iteratively performing, by the system, a second set of operations until a full physics model is determined to be feasible, where the second set of operations comprise:
   generating the full physics model based on the at least one output and a second subset of the one or more parameters, wherein the full physics model defines an architecture of an inlet manifold of the two-phase cooling structure, and models fluid communication of a coolant between the inlet manifold and the cooling channels,
   determining whether the full physics model is feasible based on whether the full physics model satisfies the at least one output of the reduced physics model and the one or more operational constraints,
   in response to a determination that the full physics model is not feasible, altering at least one parameter of the second subset, and
   in response to determining that the full physics model is feasible, combining the reduced physics model and the full physics model to define the two phase cooling structure for achieving the defined thermal performance.

2. The computer-implemented method of claim 1, wherein the at least one output comprises at least two outputs selected from the group consisting of the mass flow rate, the pressure drop, and the exit vapor quality.

3. The computer-implemented method of claim 1, wherein the heat source is a three-dimensional stacked integrated circuits microprocessor.

4. The computer-implemented method of claim 1, further comprising generating, by the system, a display showing a performance characteristic of the two phase cooling structure.

5. The computer-implemented method of claim 1, wherein the at least one output comprises the mass flow rate, the pressure drop, and the exit vapor quality.

6. The computer-implemented method of claim 1, wherein the coolant undergoes a phase change during the fluid communication.

7. The computer-implemented method of claim 1, wherein the full physics model component enforces a pressure gradient profile for the coolant during generation of the full physics model.

8. The computer-implemented method of claim 1, wherein the second set of operations further comprises tracking, by the system, coolant enthalpy evolution as the coolant is distributed through the two-phase cooling structure.

9. The computer-implemented method of claim 1, wherein the two phase cooling structure for achieving the defined thermal performance achieves a defined flow distribution of the coolant through the two phase cooling structure.

10. The computer-implemented method of claim 1, wherein the first set of operations further comprises determining, by the system, a two-phase friction pressure drop of the coolant within the cooling channels.

* * * * *